No. 758,538. PATENTED APR. 26, 1904.
H. C. KING.
RAIL CLEARER.
APPLICATION FILED JUNE 30, 1903.
NO MODEL.
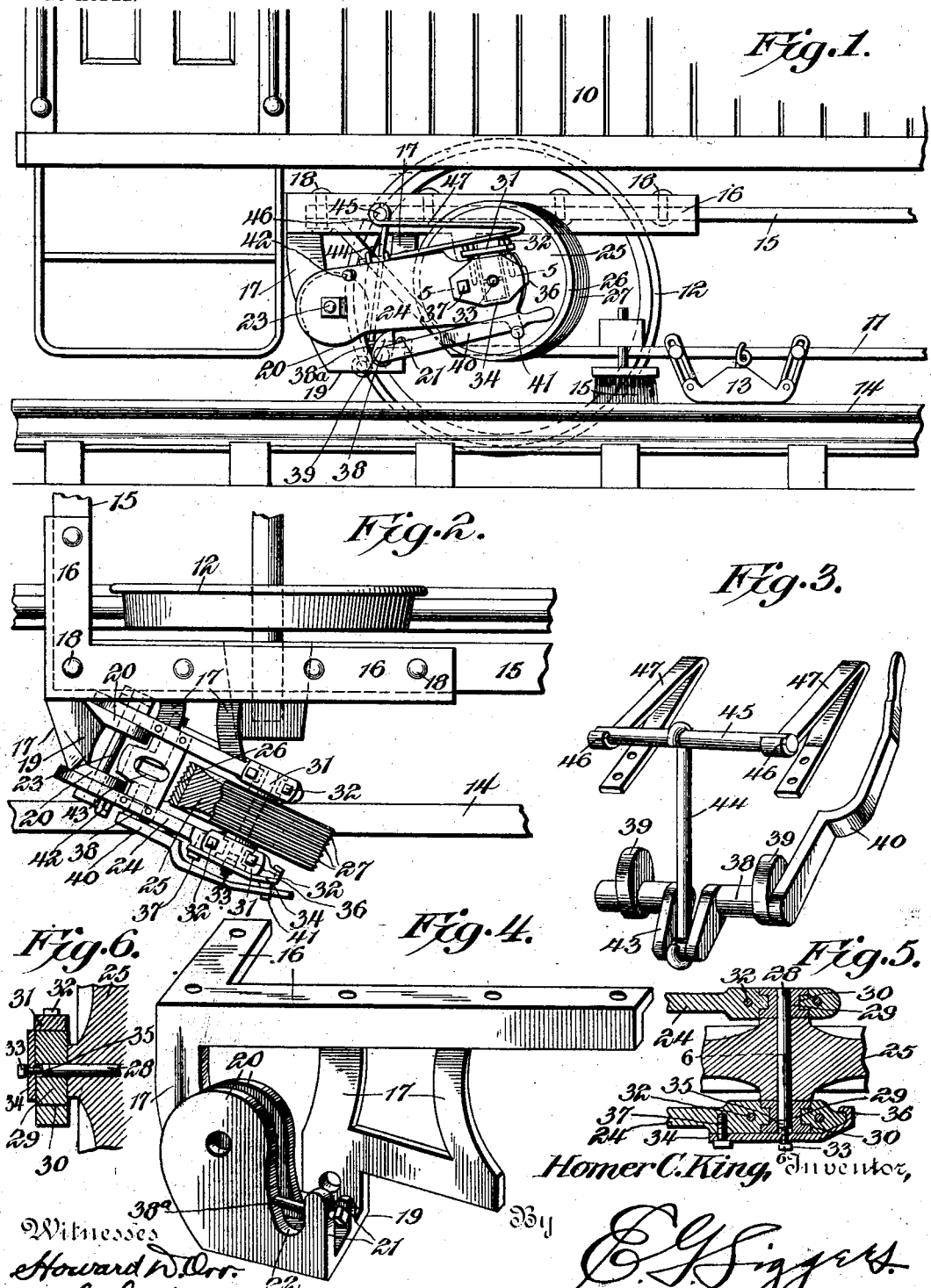
Homer C. King, Inventor
Witnesses No. 758,538. Patented April 26, 1904.

UNITED STATES PATENT OFFICE.

HOMER C. KING, OF ELGIN, ILLINOIS, ASSIGNOR OF ONE-HALF TO HARMON P. VEDDER, OF ELGIN, ILLINOIS.

RAIL-CLEARER.

SPECIFICATION forming part of Letters Patent No. 758,538, dated April 26, 1904.

Application filed June 30, 1903. Serial No. 163,812. (No model.)

*To all whom it may concern:*

Be it known that I, HOMER C. KING, a citizen of the United States, residing at Elgin, in the county of Kane and State of Illinois, have invented a new and useful Rail-Clearer, of which the following is a specification.

This invention relates more particularly to means for clearing ice and snow from the third rails of electric roads, though it may be useful for other analogous purposes. The object is to provide a structure of this character that can be readily applied to an ordinary car-truck, so that it will properly coact with the third rail and may be easily moved into and out of operative relation with respect to said rail, accordingly as it is or is not needed.

A further feature of the invention relates to novel means for yieldingly holding the clearing member in engagement with the rail, the tension upon the member being relieved to a great extent when it is moved to inoperative position, and this variation of tension being obtained by the mechanism for actuating the member. Furthermore, the elements are so related that the pressure means constitute a lock for holding the actuating means against accidental movement.

The preferred embodiment of the invention is illustrated in the accompanying drawings, wherein—

Figure 1 is a side elevation of the rail-clearer, showing the same applied to a car. Fig. 2 is a top plan view of the same, the spring mechanism being removed. Fig. 3 is a detail perspective view of the springs and actuating mechanism detached from the structure. Fig. 4 is a detail perspective view of the supporting-frame. Fig. 5 is a detail horizontal sectional view taken on the line 5 5 of Fig. 1. Fig. 6 is a vertical sectional view taken on the line 6 6 of Fig. 5.

Similar reference-numerals indicate corresponding parts in all the figures of the drawings.

In the embodiment illustrated a portion of the car 10 is shown supported upon a truck 11, in which are journaled the usual axles carrying the supporting-wheels, only one of which is illustrated and is designated 12. Upon the truck 11 is located the usual collector-shoe 13, coacting with the third rail 14, a brush 15 being disposed in advance of the collector. The structure thus far described is well known in the art and may be of any desired form, the only feature requiring further note being the upper angularly-disposed frame-bars 15 of the truck 11. The frame-bars constitute the support for the rail-clearing mechanism, which will now be described.

A frame, illustrated particularly in Fig. 4, is employed comprising angle-bars 16, having depending arms 17. The bars 16 are attached to the frame-bars 15 of the truck by means of rivets 18 or other suitable fasteners, and the frame is thus rigidly secured in place. The depending arms 17 are bent in the manner shown and are attached at their lower ends to a bracket 19, which is located in oblique relation to the truck and to the third rail 14. This bracket carries spaced upstanding ears 20, in rear of which are located upstanding lugs 21, spaced from the ears to form bearings 22.

Hinged to the ears 20, by means of a suitable bolt 23, is a vertically-swinging frame 24, in the free end of which is journaled a clearing member or wheel 25, having a hardened metallic tire 26 suitably secured thereon, the outer face of said tire being subdivided by a plurality of grooves into cutting edges 27. This wheel is arranged to engage the third rail when the bracket is swung downwardly and will be located in oblique relation to the same. The means for mounting the wheel is as follows: An axle 28 is carried thereby and is journaled in soft-metal sectional boxings 29, located in seats 30, formed in the end of the frame, the boxings being held against displacement by caps 31, fastened upon the upper bars of the frame over said boxings by means of bolts 32. The wear of the boxings occasioned by the turning of the axle can be taken up by screwing down the bolts 32, as will be readily understood. The wear caused by the end thrust due to the oblique arrangement of the clearing-wheel is provided for by means of a set-screw 33, threaded through a face-plate 34, attached to one side of the frame, the inner end of the screw 33 bearing against a rawhide or other washer 35, interposed between said end and the adjacent end of the axle. The manner of securing the plate 34 in place is illustrated in Fig. 5. One end of said plate is formed into a hook 36, which engages about the free end of one of the frame-bars and fits in a socket formed therein, the other end being fastened by a bolt 37, that is threaded into said bar.

Journaled in the bearings 22 of the bracket 19 is a rock-shaft 38, that is thus located below the wheel-carrying frame and is held in place by a bolt 38ª. This shaft has cams 39, which bear against the under sides of the frame-bars. The outer end of the shaft is provided with a lever 40, which is movable between two stops 41 and 42, formed upon the outer side of the wheel-carrying frame and on opposite sides of a vertical plane passing through the axis of the rock-shaft 38. The intermediate portion of the rock-shaft 38 is in the form of a crank 43, to which is connected the lower end of a link 44, having its upper end hung upon a cross-bar 45. The ends of this cross-bar are fitted in seats 46, formed in the free ends of substantially V-shaped springs 47, that are secured to the upper edges of the bars of the wheel-carrying frame.

The crank 43 and the cams 39 are disposed out of alinement, as illustrated in Fig. 3, but they are so related that when the lever 40 rests against the stop 41 the cams will be elevated and arranged on one side of a vertical plane passing through the axis of the shaft, while the crank 43 will be disposed on the opposite side of said plane. In this position, therefore, the wheel will be elevated, as illustrated in Fig. 1, while there will be but a slight tension on the springs, this tension, however, being sufficient to urge the crank 43 upwardly, and consequently holding the lever 40 against the stop 41. When it is desired to lower the wheel into engagement with the rail, it is only necessary to throw the lever 40 against the stop 42. This will cause the cams to descend, so as to permit the depression of the wheel-carrying frame. At the same time, however, the crank-arm will rotate in a rearwardly direction and when the lever is in engagement with the stop 42 said crank will have passed the vertical plane in which the axis of the shaft 38 is located, so that the lever will be held against said stop. The movement of the lever is, however, stopped soon after the crank 43 passes through said vertical plane, and consequently the springs will be contracted, so that greater yielding pressure will be exerted upon the wheel when it is in its depressed position than when it is raised. This will permit a comparatively great range of movement on the part of the wheel, so that it will accommodate itself to the inequalities of the third rail and will always remain in contact therewith. The oblique arrangement of the wheel is very advantageous, as it serves to thoroughly cut, plow, and pulverize the ice and snow, so that the brush can easily and completely remove the same. It will be apparent that the structure can be readily applied to an ordinary truck and the wheel can be raised and lowered with very little trouble. Moreover, said wheel is securely locked in both its raised and lowered positions, this locking effect being obtained by the means for yieldingly urging the wheel into engagement with the rail.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a rail-clearer, the combination with a rail-clearing member movable into and out of engagement with a rail, of means for yieldingly urging the member into engagement with the rail, and mechanism for increasing the tension of said yielding means upon the member when the member moves to such engagement.

2. In a rail-clearer, the combination with a rail-clearing member movable into and out of engagement with a rail, of means for yieldingly urging the member into engagement with the rail, and mechanism for decreasing the tension of said yielding means upon the member when said member moves out of such engagement.

3. In a rail-clearer, the combination with a clearing member, of means for yieldingly urging the member into engagement with the rail, said yielding means exerting greater pressure upon the clearing member when the same is in engagement with the rail than when out of such engagement.

4. In a rail-clearer, the combination with a clearing member, of means for yieldingly urging the member into engagement with the rail, said yielding means exerting greater pressure upon the clearing member when the same is in engagement with the rail than when out of such engagement, and mechanism for varying said pressure as the member is moved into or out of its engagement.

5. In a rail-clearer, the combination with a clearing member, of means for yieldingly urging the member into engagement with the rail, said yielding means exerting greater pressure on the clearing member when the same is in engagement with the rail than when out of such engagement, and mechanism for moving the member and varying the pressure accordingly as the member is moved into and out of its engagement.

6. In a rail-clearer, the combination with a clearing member movable into and out of engagement with the rail, of a spring for urging the member into engagement with the rail, and means for increasing the tension of the spring upon the member when said member moves to such engagement.

7. In a rail-clearer, the combination with a clearing member movable into and out of engagement with the rail, of a spring for yieldingly urging the member into engagement with the rail, means for moving the member, and a connection between the moving means and the spring for increasing the tension of the latter upon the member when it is moved into engagement with the rail.

8. In a rail-clearer, the combination with a movable clearing member, of means for moving the member, and mechanism for automatically locking the moving means when the member is in its operative and inoperative relations with respect to the rail.

9. In a rail-clearer, the combination with a movable clearing member, of a spring for moving the member into engagement with the rail, a device for holding the member against the tension of the spring, and a connection between the holding device and spring, said connection constituting locking means for securing the device against movement.

10. In a rail-clearer, the combination with a clearing member, of a spring for urging the member into engagement with the rail, a lever, and a crank connected to the lever and having a connection with the spring.

11. In a rail-clearer, the combination with a clearing member, of a spring for moving the member, a crank-shaft, and a connection between the crank-shaft and the spring.

12. In a rail-clearer, the combination with a swinging clearing member, of a spring for urging the member into engagement with the rail, a rock-shaft having a crank, a link connection between the crank and spring, and a lever attached to the rock-shaft.

13. In a rail-clearer, the combination with a clearing member, of a spring for urging the member into engagement with a rail, a rock-shaft having a connection with the spring, a lever attached to the rock-shaft, and means for limiting the movement of the lever.

14. In a rail-clearer, the combination with a supporting-frame, of a carrier-frame hinged to the supporting-frame, a clearing-wheel journaled upon the carrier-frame, a spring mounted on the frame for urging the same downwardly, a rock-shaft having a crank, a link connection between the crank and the spring, a lever attached to the rock-shaft, and stops mounted on the carrier-frame to limit the movement of the lever.

15. In a rail-clearer, the combination with a clearing member movable into and out of engagement with a rail, of a cam for moving the clearer.

16. In a rail-clearer, the combination with a swinging carrier-frame, of a clearing-wheel revolubly mounted on the frame, a rock-shaft, and a cam carried by the rock-shaft and engaging the carrier-frame to move the same.

17. In a rail-clearer, the combination with a clearing member, of a rock-shaft, a cam carried by the rock-shaft and engaging the member, and means for actuating the shaft.

18. In a rail-clearer, the combination with a carrier member, of a spring for urging the member in one direction, means for moving the member in another direction, and an actuating device having connections with the moving means and with the spring.

19. In a rail-clearer, the combination with a clearing member, of a spring for urging the member in one direction, a rock-shaft having cams that engage the member to move the same in an opposite direction, and a crank connection between the rock-shaft and the spring.

20. In a rail-clearer, the combination with a supporting-frame, of a carrier-frame hinged to the supporting-frame, a clearer-wheel journaled upon the carrier-frame and coacting with the rail, a shaft journaled upon the supporting-frame beneath the carrier-frame, cams attached to the shaft and engaging the under side of the carrier-frame, a lever for moving the shaft, a spring mounted upon the carrier-frame, and a crank connection between the shaft and the spring.

21. In a rail-clearer, the combination with a supporting-frame, of means for securing the frame to a truck, a carrier-frame mounted on the supporting-frame, and disposed diagonally thereto, and a clearing-wheel journaled upon the carrier-frame.

22. In a rail-clearer, the combination with a frame, of means for securing the frame to a truck, a bracket constituting a part of the frame and located in angular relation to the remainder of the same, a carrier-frame hinged to the bracket, and a clearing-wheel mounted on the carrier-frame and disposed diagonally to the rail.

23. In a rail-clearer, the combination with a frame having angularly-disposed bars, of means for securing the bars to a car-truck, a carrier-frame movably mounted on the supporting-frame and in angular relation thereto, and a clearer journaled upon the carrier-frame.

24. In a rail-clearer, a wheel, and a hardened metallic tire fitted on the wheel and provided with a plurality of annular cutting edges.

25. In a rail-clearer, the combination with a carrier-frame, of boxings mounted in the frame, a wheel loosely journaled in the boxings and disposed diagonally to the rail to be cleared, and means for taking up the wear of the boxings.

26. In a rail-clearer, the combination with a carrier-frame, of a clearing-wheel having an axle journaled in the frame, and means bearing against one end of the axle and constituting a thrust-bearing therefor.

27. In a rail-clearer, the combination with a carrier-frame, of a clearer-wheel having an axle journaled in the frame, a plate attached to the frame, and a screw threaded through the plate and bearing against the end of the axle.

In testimony that I claim the foregoing as my own I have hereto affixed my signature in the presence of two witnesses.

HOMER C. KING.

Witnesses:
 BERT R. TRACY,
 WILLIAM G. WESTERMAN.